United States Patent [19]
Jouanneau et al.

[11] Patent Number: 6,139,885
[45] Date of Patent: Oct. 31, 2000

[54] PREPARATION OF TOASTED BREAD PRODUCT HAVING A TOPPING FOR MICROWAVE HEATING

[75] Inventors: Hervé Jouanneau, Songeons, France; Jacques Popot, Twinsburg, Ohio; Jean-François Tharrault, Coincourt, France

[73] Assignee: Nestec S.A., Vevey, Switzerland

[21] Appl. No.: 09/243,576

[22] Filed: Feb. 3, 1999

[30] Foreign Application Priority Data

Feb. 13, 1998 [EP] European Pat. Off. ............... 98200451

[51] Int. Cl.⁷ .................................................. A21D 10/00
[52] U.S. Cl. ........................... 426/94; 426/128; 426/241; 426/275; 426/496; 426/549
[58] Field of Search ................. 426/505, 113, 426/518, 12, 523, 524, 128, 89, 90, 94, 107, 302, 275, 316, 549, 556, 576, 578, 653, 384, 385, 391, 393, 396, 412, 418, 439, 441, 443, 466, 249, 503, 497, 499, 496

[56] References Cited

U.S. PATENT DOCUMENTS

| | | | |
|---|---|---|---|
| 3,667,963 | 6/1972 | Katter et al. | 99/86 |
| 3,983,256 | 9/1976 | Norris et al. | 426/94 |
| 4,020,184 | 4/1977 | Chesner | 426/94 |
| 5,009,867 | 4/1991 | Kratochvil | 426/128 |
| 5,049,398 | 9/1991 | Saari et al. | 426/20 |
| 5,104,669 | 4/1992 | Wolke et al. | 426/94 |
| 5,614,240 | 3/1997 | Young | 426/505 |

FOREIGN PATENT DOCUMENTS

| | | | |
|---|---|---|---|
| 0 350 660 | 1/1990 | European Pat. Off. | H05B 6/64 |
| 2 571 224 | 5/1986 | France | A23P 1/08 |
| 2 587 595 | 3/1987 | France | A23P 1/08 |

OTHER PUBLICATIONS

Database Abstract, Derwent Information, Ltd., WPI Accession No. 96–072251/199608, XRAM Accession No. C96–023178, abstract of Japanese Patent Document JP–A–07 327 585.

Database Abstract, Derwent Information, Ltd., WPI Accession No. 95–220074/199529, XRAM Accession No. C95–101301, abstract of Japanese Patent Document JP–A–07 132 040 (1995).

*Primary Examiner*—Gabrielle Brouillette
*Assistant Examiner*—Hao Mai
*Attorney, Agent, or Firm*—Vogt & O'Donnell, LLP

[57] ABSTRACT

A composite food product for consumption after microwave heating is obtained by preparing a dough with, by weight, from 55% to 65% flour and from 28 to 40% water, the dough is baked to obtain a bread so that the bread has a water content of from 17% to 22% less than a water content of the dough, and then the bread, after advantageously being allowed to rest for from 1 day to 7 days at a temperature of 4° C. to 10° C., is sliced, to provide a slice or slices having at least one crumb surface which then is toasted and after which, a food composition topping, which may be in an amount, by weight based upon the composite product weight, of from 50% to 75%, is placed upon the toasted crumb surface, and then the composite product obtained is packaged and refrigerated or frozen. Further advantageously, a composition of fat is spread on the toasted surface before the placing of the food composition topping to provide a product which has a fat composition layer between the topping and the toasted surface, and the topping may have, by weight, a water content of from 40% to 80%.

18 Claims, No Drawings

PREPARATION OF TOASTED BREAD PRODUCT HAVING A TOPPING FOR MICROWAVE HEATING

BACKGROUND OF THE INVENTION

The present invention relates to preparation of products which are subjected to microwaves for heating for preparing the products for consumption and particularly to preparation of breads and bread products prepared for consumption by heating with microwaves and also to use of susceptors during microwave heating.

In the field of frozen products or of refrigerated products, it is known to prepare toasts or slices of bread with topping which can be regenerated (i.e., heated for consumption) in a traditional oven, in a toaster or in a frying pan.

The company Herta has in particular introduced onto the French market, under the name "TARTINE D'HERTA", a sliced bread consisting of a slice of bread and a ham-cheese type topping. This sliced bread is stored at refrigerator temperatures or in the freezer and then, at the time of its consumption, is regenerated in a traditional oven at 220° C. or in a frying pan with a portion of fat.

French patent application publication No. 2,571,224 describes a process for the preparation of a sliced bread for freezing, consisting of a slice of bread on which a topping having a sufficiently dense consistency, so that it does not run, is spread. This sliced bread is wrapped in an aluminium bag, either before or after being frozen, and is then heated in a traditional oven at the time of its consumption.

Heating such food products in a traditional oven takes time. Indeed, it is necessary to preheat the oven for a few minutes, in order to reach the desired heating temperature, and then about fifteen minutes are required in order to homogeneously heat the food product and to give it a nice brown colour.

Moreover, heating such food products in a frying pan also takes time and fat should be added to the bottom of the frying pan in order to prevent the food product from sticking. Consequently, the product is inevitably enriched with an excess of fat.

Currently, the use of microwave ovens, especially for rapidly and homogeneously heating or reheating prepared meals is widespread among consumers, that is to say among individuals and in the catering sector.

However, this type of known sliced bread or toast cannot be regenerated (i.e., heated for consumption) in a microwave oven. Indeed, regeneration (i.e., heated for consumption) of such food products in a microwave oven would mean the formation of a nonhomogeneous and rubbery texture of the crumb of the slice of bread and often a dispersion, in the slice of bread, of the liquid fraction of the topping. This nonhomogeneous and rubbery texture is thought to come from a migration of part of the quantity of water contained in the crumb of the slice of bread towards the crust of the slice of bread, followed by drying and polymerization of the proteins in the flour content in the slice of bread.

SUMMARY OF THE INVENTION

The aim of the present invention is to overcome the problems noted above by providing a composite product which comprises at least one slice of bread having a toasted crumb slice surface and a topping on the toasted crumb surface which provides a base for the topping, and the product can be stored at refrigerator temperatures or in the freezer and then regenerated (i.e., heated for consumption) in a microwave oven in a relatively short time of from 2 to 6 min. Moreover, the present invention relates to a process for the preparation of such a composite product wherein a dough is prepared and then baked to obtain a bread so that the bread has, by weight, a water content of from 17 to 22% less than that of the dough, the baked bread advantageously is allowed to rest at a temperature of from 4 to 10° C. for from 1–7 days, and then the baked, or rested, bread is cut to obtain a slice or slices having a a crumb surface and crust portion, and a slice, or slices, is/are toasted to toast a crumb surface, a topping is placed on the toasted crumb surface and then the bread slice(s) with the topping—the composite product—is packaged in plastic or cardboard packaging and is refrigerated or frozen for storage.

The composite product according to the present invention, after being frozen or refrigerated and then regenerated (i.e., heated) in a microwave oven, has a soft texture in the crumb of the slice of bread and a crisp texture in the crust of the slice of bread.

It has been observed, surprisingly, that the composite product according to the invention has, after regeneration in a microwave oven in a relatively short time, a texture comparable to that of a fresh product of the same type which is heated in a traditional oven for about 15 minutes.

During the regeneration in a microwave oven, the composite product according to the invention may be placed on a cardboard support with an aluminized film, having the effect of a susceptor, for example.

DESCRIPTION OF PREFERRED EMBODIMENTS AND DETAILED DESCRIPTION OF THE INVENTION

Preferably, the composite product according to the invention comprises at least one slice of bread having a toasted crumb surface as described above and a topping between which a layer of fat is spread. There may be used, as fat, vegetable fat, such as olive oil, palm oil or groundnut oil, or animal fat, such as butter or lard, for example. Accordingly, to prepare the further preferred toast product, the process of the present invention as set forth above further includes a step of spreading a fat on a toasted crumb surface of a bread slice, and that step is carried out after the slice toasting step and prior to the topping placement step and thus, a layer of fat is spread on a toasted crumb surface and the topping is placed on the fat spread on the toasted surface.

The fat layer may correspond to 2–6% of the final weight of the toast, for example. If the fat layer corresponds to a value less than 2% of the final weight of the toast, its quantity is not sufficient to cover the entire slice of bread. On the other hand, if it corresponds to a value greater than 6% of the final weight of the toast, a toast is obtained which has an excessively high fat content, in which the fat penetrates into the entire thickness of the slice of bread. Preferably, the fat layer is in an amount of from to 3–4% of the final weight of the toast.

The layer of fat spread between the slice of bread and the topping plays two roles; on the one hand, it makes it possible to avoid the migration of water between the topping and the slice of bread and, on the other hand, it absorbs the microwaves, thus making it possible, at high temperatures, to cause the ice crystals contained in the toast, if it has been frozen, to melt and to develop a soft texture in the bread crumb and a crisp texture in the crust of the slice of bread.

The toast according to the present invention may consist of at least one slice of bread obtained from a bread prepared from a dough based on 55–65% flour, 1–3% sugar, 1–3% added proteins, 0.1–1% emulsifier, 0.5–2% yeast, 0.5–1.5% salt, 1–5% fat and 28–40% water, for example.

The flour may be soft wheat flour containing 10% protein and 0.55% ash, for example. It is also possible to use a mixture of flours based on 70–90% soft wheat flour and 10–30% rye flour, maize flour and/or hard wheat flour, for example. It is possible to enzymatically treat the flour with enzymes of the amylase and/or pentosanase type in order to improve, during the regeneration of the toast according to the invention in a microwave oven, the soft texture of the crumb of the slice of bread, the colour of the crust of the slice of bread as well as the toast volume.

The sugar may be in crystalline form or in syrup form, for example. It acts as substrate during the fermentation and also contributes to the colour of the slice of bread during baking.

The proteins added may be milk proteins or egg white proteins, for example. Their main role is to stabilize the retention of the gas developed in the dough, during its fermentation, thus making it possible to improve the final volume of the bread and to promote the colour of the crust.

The emulsifier may be lecithin, DATEM, that is diacetyl tartaric ester of monoglycerides and/or SSL, that is, sodium stearyl lactilate, for example.

The yeast may be baker's yeast, dehydrated or otherwise, or baking powder, for example. It is also possible to add in addition deactivated yeast so as to weaken the gluten network and to reduce its polymerization during reheating in a microwave oven, for example.

The fat may be in the form of a fat, powder or an oil, for example. It makes it possible to improve the soft texture of the crumb of the slice of bread.

The bread, prepared from a dough based on flour, sugar, added proteins, emulsifier, yeast, salt, fat and water is therefore manufactured according to a traditional process, with batch or continuous kneading, fermentation, shaping and dividing followed by a proving step in a chamber at 30–36° C., for 30–90 min, depending on the size of the bread. Preferably, loaves of 500 g to 2 kg are manufactured so as to then be able to cut even slices of bread and to also reduce the cutting scraps. The proving step as well as the baking step can be carried out on plates, on a band or in moulds, for example.

To obtain a bread with an even and crisp crust, a step of steaming, that is to say of injection of steam, of 1–2 min at 210–230° C., can be carried out at the beginning of the baking step, for example. The bread may be baked at 210–230° C. for 40–60 min. During the baking, care is taken that the water loss is 17–22% and preferably 18–19%.

After the baking step, the bread is allowed to cool and then it is allowed to rest at 4–10° C. for 1–7 days, preferably 4–6 days, so that an equilibrium is established between the water content of the crumb and that of the crust of the bread and so that the bread can be better cut into slices.

Preferably, the water content in the crust of the slice of bread is 4–7%, before this resting step, and 15–23% after this resting step. Preferably, the water content in the crumb of the slice of bread is 31–40% before this resting step, and 20–30% after this resting step.

The bread can then be cut into slices having a thickness of 10–20 mm, for example. Preferably 14–16 mm slices are cut. In carrying out the process of the invention, the toasting step can be carried out by passing the slice of bread, for a period of 10–25 seconds, preferably 20 seconds, under infrared lamps, for example. During the toasting step, the water content of the slice of bread can be reduced so that it has a weight from 4–6%, for example. The slice may be toasted on one of the two sides or on both sides.

In the preferred embodiment, a layer of fat is then spread over the toasted slice of bread. As specified above, this layer of fat may be vegetable fat or animal fat, for example. The property of the barrier layer of fat, described above, that is to say protection against moisture may be increased with the incorporation into the fat layer of a film-forming protein, such as calcium caseinate and of a hydrocolloid, such as iota-type carrageenan, for example.

Topping is then placed on the slice of bread so as to obtain a toast with topping. The topping may have a water content of 40–80%, for example. Preferably, a proportion of topping of 50–75% relative to the final weight of the toast is used.

The topping may be a savoury topping or a sweet topping.

If it is desired to prepare a savoury toast, a savoury topping comprising pieces of meat or fish, eggs, a sauce, whole vegetables and/or vegetable pieces, cheese, spices and/or cereals may be placed on the toast, for example.

The meat may be beef, chicken, turkey, veal, pork or prepared meat products such as ham, sausage or salami, for example.

The fish may be cod, salmon, sole or hake, for example. Precooked or raw meat or fish pieces may be added, for example. Minced meat or fish in sauce may also be added, for example.

The eggs may be hard-boiled or scrambled eggs, for example.

The whole vegetables may be maize seeds, peas or beans, for example. The vegetable pieces may be tomatoes, sweet peppers, mushrooms, potatoes, onions, celery, carrots, or broccoli, for example. The whole vegetables and/or vegetable pieces may be blanched or precooked before adding them to the paste, for example. They may also be added in the form of a puree, for example.

The cheese may be gruyère, mozzarella, cheddar or emmental, for example.

The sauce may be mustard, ketchup, tomato sauce or a white sauce, for example.

The cereals may be polished rice or pearl barley which may be precooked, or sesame or poppy, for example.

The spices may be pepper, rosemary, sage, ginger, thyme, chilli or cumin, for example.

If it is desired to prepare a sweet toast, a topping comprising whole fruits and/or fruit pieces, fruit puree, fruit jam, eggs, a sauce, spices and/or cereals may be placed on the toast, for example.

The whole fruits may be strawberries, raspberries, bilberries, cherries, red currants or blackberries, for example. The fruit pieces may be apples, pears, pineapples or apricots, for example.

The sauce may be a vanilla sauce, a caramel sauce or a chocolate sauce, for example.

The spices may be cinnamon or vanilla, for example.

The cereals may be polished rice or pearl barley which may be precooked, for example.

After having placed the topping on the first slice of bread, it is possible to superpose a second slice of bread, previously toasted and on which a layer of fat has then been spread, for example. The side of the second slice on which a layer of fat has been spread will be brought into contact with the topping.

The toast thus prepared is then packaged in a plastic packaging or a cardboard packaging before being stored at refrigerator temperatures or in a freezer.

Before packaging the toast and storing it at refrigerator temperatures or in a freezer, it may be subjected to a baking step for 5–10 min at 160–200° C., for example.

If the toast is stored in a freezer, it can be frozen before being packaged, for example.

The toast thus prepared can be placed, before being packaged, on a cardboard support with an aluminized film having the effects of a susceptor during heating or reheating in a microwave oven, for example.

To aid the evaporation of the moisture, the toast according to the invention may also be placed on absorbent paper, to heat it in a microwave oven, for example.

During the heating in a microwave oven, the crust of the slice of bread dries very rapidly to a moisture of less than 2%. This therefore makes it possible to obtain the desired crisp texture in the crust. On the other hand, the crumb of the slice of bread is then impregnated with the fat layer, which will make it soft.

EXAMPLES

The present invention is described in greater detail with the aid of the nonlimiting examples below. In these examples, the percentages are given by weight unless otherwise stated.

Example 1

Toasts for which the topping is of the pizza type are prepared.

To do this, a bread dough is first prepared which contains 1.75 kg of soft wheat flour, 0.02 kg of granulated sugar, 0.04 kg of milk proteins, 0.03 kg of salt, 7 g of emulsifier, SSL, 0.06 kg of fresh baker's yeast, 0.06 kg of sunflower oil and 1.03 kg of water.

This dough is kneaded batchwise, fermentation is carried out, it is shaped and it is divided into dough pieces of 1 kg, before leaving it in a proving chamber at 34° C. for 45 min. The dough pieces are then baked for 50 min at 220° C. so as to obtain browned loaves. Care is taken to ensure that the water loss in these loaves, during baking, is 18%.

After the baking step, the loaves are allowed to cool and then they are allowed to go stale for 5 days so that an equilibrium is established between the water content of the crumb and that of the crust of the loaves. The loaves can thus be better cut into slices, for example.

The loaves are cut into slices with a thickness of 15 mm.

One side of the slices of bread which are thus cut is toasted by a passage of 20 seconds over infrared lamps so as to then obtain the crispness with microwaves. During this pretoasting step, the water content of the slices of bread is reduced so as to have a weight loss of 5%.

A layer of a mixture containing 3% olive oil, 0.5% calcium caseinate and 0.5% iota-type carrageenan, relative to the final weight of the toast, is then spread on the slices of bread.

A pizza-type topping is then prepared which contains 80% onion pieces, 5% virgin olive oil, 2.5% crushed garlic, 8.2% tomato puree, 0.8% fine salt, 0.1% white pepper, 0.1% ground Cayenne pepper and 2% freeze-dried basil.

The pizza-type topping is then placed on the slices of bread, in a proportion of 60% relative to the final weight of the toast. The topping has a water content of 70%.

The toasts thus prepared, which have been placed on a cardboard support with an aluminized film, are then packaged in cardboard packages before being stored in a freezer.

The consumer then regenerates the toasts thus prepared in a microwave oven for 2 min, for a power of 900 watts, so as to heat them and give a soft texture to the crumb of the slice of bread and a crisp texture to the crust of the slice of bread.

Example 2

Toasts are prepared which have a topping containing scrambled eggs and lardons.

To do this, toasted slices of bread are prepared on which a layer of a mixture has been spread which contains 3% sunflower oil, 0.5% calcium caseinate and 0.5% iota-type carrageenan, relative to the final weight of the toast, as described in Example 1.

A topping containing scrambled eggs and lardons is then prepared which contains 35% béchamel sauce, 41% scrambled eggs, 17% lardons and 7% of a mixture of spices.

The pizza-type topping is therefore then placed on the slices of bread, in a proportion of 63% relative to the final weight of the toast. The topping has a water content of 60%.

The toasts thus prepared, which have been placed on a cardboard support with an aluminized film, are then packaged in cardboard packages before being stored in a freezer.

The consumer then regenerates the toasts thus prepared in a microwave oven for 3 min at 900 watts, so as to heat them and to give a soft texture to the crumb of the slice of bread and a crisp texture to the crust of the slice of bread.

Example 3

Toasts having a chocolate topping are prepared.

To do this, a bread dough is first prepared which contains 1.9 kg of soft wheat flour, 0.06 kg of granulated sugar, 0.06 kg of milk proteins, 0.03 kg of salt, 0.01 kg of emulsifier, SSL, 0.06 kg of fresh baker's yeast, 0.06 kg of sunflower oil and 0.82 kg of water.

This dough is kneaded batchwise, fermentation is carried out, it is shaped and it is divided into dough pieces of 1.5 kg, that are left in a proving chamber at 32° C. for 45 min. The dough pieces are then baked for 50 min at 190° C. so as to obtain browned loaves. Care is taken to ensure that the water loss in these loaves is 19%.

After the baking step, the loaves are allowed to cool and then they are allowed to go stale for 6 days so that an equilibrium is established between the water content of the crumb and that of the crust of the bread. The loaves can thus be better cut into slices, for example.

The loaves are cut into slices with a thickness of 13 mm.

One side of the slices of bread which are thus cut is toasted by a passage of 22 seconds over infrared lamps so as to then obtain the crispness with microwaves. During this pretoasting step, the water content of the slices of bread is reduced so as to have a weight loss of 5%.

A layer of a mixture containing 3% butter, 0.5% calcium caseinate and 0.5% iota-type carrageenan, relative to the final weight of the toast, is then spread on the slices of bread.

A chocolate topping is then prepared which contains 20% milk powder, 40% cocoa powder, 2% egg yolk and 38% cream containing 45% fat.

The chocolate topping is then placed on the slices of bread, in a proportion of 57% relative to the final weight of the toast, the topping has a water content of 55%.

The toasts thus prepared, which have been placed on a cardboard support with an aluminized film, are then packaged in cardboard packages before being stored in a freezer.

The consumer then regenerates the toasts thus prepared in a microwave oven for 3 min, at 900 watts, so as to heat and give a soft texture to the crumb of the slice of bread and a crisp texture to the crust of the slice of bread.

We claim:

1. A process for preparation of a composite food product comprising a toasted bread slice product for consumption after heating with microwaves comprising the steps of:

combining ingredients for making a dough and preparing a dough, wherein the ingredients comprise, by weight based upon the weight of the ingredients combined, from 55% to 65% flour, from 1% to 3% of a protein material, from 1% to 5% fat, from 1% to 3% sugar, from 0.5% to 2% yeast, from 0.1% to 1% emulsifier, from 0.5% to 1.5% salt and from 28% to 40% water, and forming the dough into a loaf form for preparation of a bread loaf;

baking the formed dough loaf to obtain a bread loaf and so that the bread loaf obtained has, by weight, a water content of from 17% to 22% less than a water content of the dough;

allowing the bread loaf obtained to rest at a temperature of from 4° C. to 10° C. for from 1 day to 7 days to obtain a rested bread;

slicing the rested bread loaf to obtain a bread slice having a sliced bread crumb surface and a bread crust portion;

toasting a slice obtained to toast a sliced bread crumb surface of the slice obtained to obtain a toasted slice which comprises a toasted sliced bread crumb surface;

spreading a layer of a composition which comprises a fat on the toasted surface to obtain a toasted slice having a spread layer to protect the toasted surface from moisture;

placing a food composition topping on the spread layer to obtain a composite product having a toast slice base;

packaging the composite product in a package comprising a packaging material selected from the group consisting of a plastic material and a cardboard material to obtain a packaged product; and storing the packaged product under a condition selected from the group consisting of a refrigeration condition and a frozen condition.

2. A process according to claim 1 wherein the composition which comprises the fat further comprises a member selected from the group consisting of a film-forming protein composition and a hydrocolloid.

3. A process according to claim 2 wherein the member is selected from the group consisting of calcium case mate and an iota-carrageenan.

4. A process according to claim 1 wherein, by weight based upon a weight of the composite product, the food composition topping placed on the spread layer is in an amount of from 50% to 75%.

5. A process according to claim 1 or 2 wherein, by weight based upon a weight of the composite product, the spread layer is in an amount of from 2% to 6%.

6. A process according to claim 1 wherein the food composition topping has, by weight, a water content of from 40% to 80%.

7. A process according to claim 1 wherein, by weight based upon a weight of the composite product, the spread layer is in an amount of from 2% to 6% and the food composition topping is in an amount of from 50% to 75%.

8. A process according to claim 7 wherein the food composition topping has a water content of from 40% to 80%.

9. A process according to claim 1 wherein the resting step is carried out for a time so that the bread crust portion water content and bread crumb water content equilibrate.

10. A process according to claim 1 wherein the resting step is carried out so that, after resting, the bread crust portion of the rested bread has a water content of from 15% to 23% and the bread crumb of the rested bread has a water content of from 20% to 30%.

11. A process according to claim 1 further comprising, after the steps of preparing and forming the dough and before the step of baking the dough, a step of steaming the formed dough.

12. A process according to claim 11 wherein the dough is steamed for from 1 minute to 2 minutes with steam at a temperature of from 210° C. to 230° C.

13. A process according to claim 1 wherein after the step of placing the food topping and prior to the step of packaging, the composite product is frozen.

14. A process according to claim 1 wherein the package comprises a cardboard material and an aluminized film configured so that upon subjecting the packaged product to microwaves, the aluminized film is a microwave susceptor.

15. A process according to claim 1 wherein two slices are toasted to obtain two slices having toasted bread crumb surfaces, wherein the composition which comprises the fat is spread in a layer on the toasted surfaces of each toasted slice and wherein the food composition topping is placed upon the spread layer of one toasted slice and further comprising superposing the spread layer of a second toasted slice on the topping so that the topping is positioned between the spread layers.

16. A process according to claim 1 wherein the protein material is selected from the group consisting of milk protein and egg white protein.

17. A process according to claim 1 wherein the rested bread is cut so that the at least one slice has a thickness of from 10 mm to 20 mm.

18. A process according to claim 5 wherein the food composition topping has, by weight, a water content of from 40% to 80%.

* * * * *

UNITED STATES PATENT AND TRADEMARK OFFICE
CERTIFICATE OF CORRECTION

PATENT NO. : 6,139,885
DATED : October 31, 2000
INVENTOR(S) : Hervé JOUANNEAU, et al.

It is certified that error appears in the above-identified patent and that said Letters Patent is hereby corrected as shown below:

In line 2 of claim 3 (col. 7, ln. 48), delete "case mate" and insert therefor -- caseinate --.

Signed and Sealed this

Eighth Day of May, 2001

Attest:

NICHOLAS P. GODICI

Attesting Officer

Acting Director of the United States Patent and Trademark Office